United States Patent [19]

Horike

[11] 4,400,705

[45] Aug. 23, 1983

[54] INK JET PRINTING APPARATUS

[75] Inventor: Masanori Horike, Tokyo, Japan

[73] Assignee: Ricoh Company, Ltd., Tokyo, Japan

[21] Appl. No.: 214,559

[22] Filed: Dec. 8, 1980

[30] Foreign Application Priority Data

Dec. 18, 1979 [JP] Japan ................................ 54-164610

[51] Int. Cl.[3] ............................................ G01D 15/18

[52] U.S. Cl. ................................ 346/75; 346/140 R; 310/315

[58] Field of Search ................. 346/75, 140 R, 140 IJ; 310/315, 316, 317

[56] References Cited

U.S. PATENT DOCUMENTS 3,787,882 1/1974 Fillmore et al. ........................ 346/75

4,275,402 6/1981 Kem ................................. 346/75 X

*Primary Examiner*—Stafford D. Schreyer

*Attorney, Agent, or Firm*—David G. Alexander

[57] ABSTRACT

Ink jet deflection is maintained constant regardless of ink temperature by varying the amplitude of pressure oscillation applied to ink in an ejection head (1) as a function of temperature. The pressure oscillation causes the ink to be ejected from the head (1) and separate into droplets. The droplets are charged and electrostatically deflected where it is desired to print a dot. Variation of the amplitude of pressure oscillation changes the shape of the droplets and thereby the amount of charge thereon and the deflection.

1 Claim, 5 Drawing Figures

INK JET PRINTING APPARATUS

BACKGROUND OF THE INVENTION

The present invention relates to an ink jet printing apparatus. In such an apparatus, pressure oscillation is applied to ink in an ejection head by an electrostrictive vibrator thereby causing a jet of ink to be ejected from the head. The jet separates into droplets which are charged and electrostatically deflected onto a copy sheet where it is desired to print a dot. Where it is not desired to print a dot, the droplets are not charged and hit a gutter. Orthogonal scanning movement is effected between the head and sheet.

A problem which has remained heretofore unsolved in such an apparatus is that the amount of deflection of the ink droplets varies in accordance with the ink temperature and the position of the printed dot on the sheet accordingly varies. Although various expedients have been proposed to overcome this problem, a completely satisfactory solution has not been discovered heretofore.

SUMMARY OF THE INVENTION

An ink jet printing apparatus embodying the present invention includes an ink ejection head, vibrator means for applying pressure oscillation to the head thereby causing a jet of ink to be ejected from the head and separate into droplets, charging means for applying an electrostatic charge to the droplets and deflection electrode means for deflecting the charged droplets, characterized by comprising:

ink temperature sensor means for sensing an ink temperature; and computing means for controlling an amplitude of pressure oscillation applied by the vibrator means to the head as a function of sensed ink temperature which is predetermined in such a manner that an amount of deflection of the charged droplets is the same at all ink temperatures.

In accordance with the present invention, ink jet deflection is maintained constant regardless of ink temperature by varying the amplitude of pressure oscillation applied to ink in an ejection head as a function of temperature. The pressure oscillation causes the ink to be ejected from the head and separate into droplets. The droplets are charged and electrostatically deflected where it is desired to print a dot. Variation of the amplitude of pressure oscillation changes the shape of the droplets and thereby the amount of charge thereon and the deflection.

It is an object of the present invention to control the amount of ink jet deflection without using control of the level of a charging voltage.

It is another object of the present invention to compensate for deviation of ink jet deflection attributable to temperature variation without using control of the level of a charging voltage.

It is another object of the present invention to provide a generally improved ink jet printing apparatus.

Other objects, together with the foregoing, are attained in the embodiments described in the following description and illustrated in the accompanying drawing.

Figure 1:
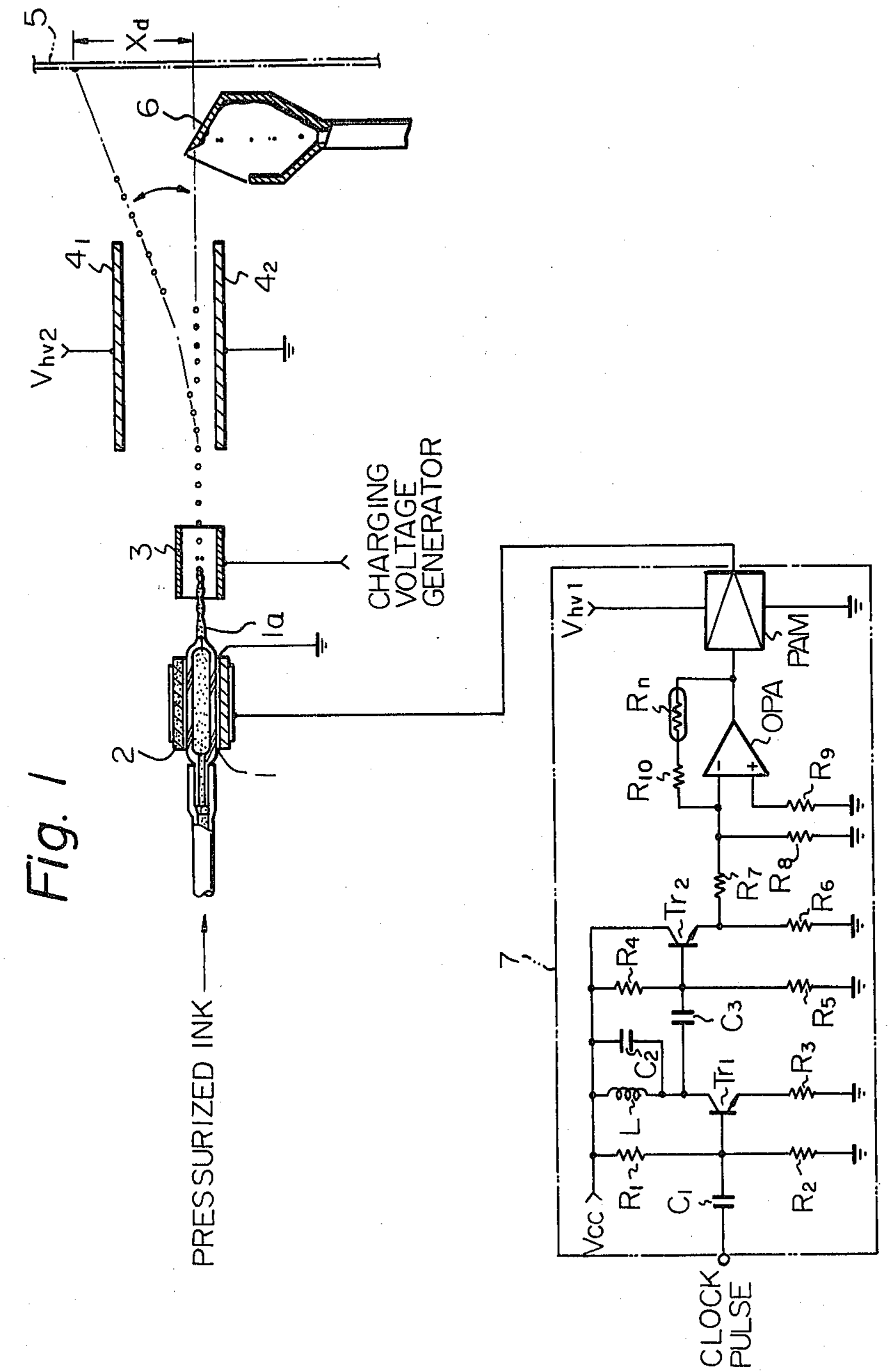
FIG. 1 is a diagram showing an apparatus embodying the present invention.

FIG. *2a* is a graph showing the relationship between ink temperature and amount of deflection in an ink jet printing process;

FIG. *2b* graphically shows the relationship between the drive voltage for ink ejection and the amount of charge on an ink droplet; and FIGS. *3a* and *3b* illustrate in enlarged side elevation two columns of ejected ink.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

A printing process of the present type involves a problem concerning deviation of the amount of ink jet deflection, and thereby deviation of the printing position. The amount of deflection of ink droplets $x_d$ is basically expressed as:

$$x_d=(Q_j/m_j)\cdot(1/v_j^2)\cdot EK \quad \text{...Eq. (1)}$$

where $Q_j$ indicates the amount of charge on an ink droplet, $m_j$ the mass of the ink droplet, $v_j$ the flying velocity of the ink droplet, E the intensity of the deflecting electric field, and K a constant which depends on the length of deflecting electrodes and the distance between the deflecting electrodes and a recording surface.

As the viscosity of ink decreases as a result of a drop in the ambient temperature, the flying velocity $v_j$ and mass $m_j$ increase and the increase in the mass $m_j$ causes the amount of charge $Q_j$ to increase. However, in Eq. (1), the amount of deflection $x_d$ decreases despite the fact that an increase in the kinetic energy resulting from the increases in $V_j$ and $m_j$ is reflected by an increase in the amount of charge $Q_j$. FIG. *2a* schematically shows the relationship between the temperature T and amount of charge $x_d$.

The amount of deflection of an ink droplet varies in this way in accordance with the temperature. There is known a method which compensates for such deviation in deflection by controlling the voltage level applied to a charging electrode in accordance with the temperature such that, when the temperature rises, the voltage level follows this temperature elevation to in turn increase the amount of charge to be deposited on an ink droplet. Another countermeasure heretofore proposed is the use of ink whose viscosity and other characteristics vary to a reduced extent with temperature. The first expedient based on the control of voltage level cannot readily be carried out, however, in connection with charge compensation for the removal of charge distortion. When a droplet is to be separated from an ink jet or column, the amount of charge on the droplet may deviate from a desired value under the influence of the charge amount on the preceding droplet or droplets (charge distortion). The deflection may undergo deviation due to the Coulomb force acting between flying charged droplets. Furthermore, droplets which are not expected to be charged may be charged or combined by electrostatic induction attributable to charged droplets resulting in deviation in deflection and/or variation in droplet size. Thus, charge compensation is carried out, or the level of a charging voltage is compensated in accordance with the charge amount on the preceding ink droplet (more exactly, the level of a voltage applied to the charging electrode) every time a droplet is separated from an ink column. This occurs, for example, for each cycle of a 100 kHz drive frequency (every time one ink droplet is formed) and, therefore, a very fast response is needed in the control. On the other hand, temperature variation proceeds very slowly and, compared with the compensatory charge control, is so slow that it can be considered as being rather in a static state. The control for temperature compensation proceeds very slowly. Accordingly, where it is desired to perform both the compensatory charge control and temperature compensation control with a charging voltage generator adapted to apply a stepwise voltage having two levels or three or more levels to the charging electrode, the voltage generator must have a significantly broad response band. Difficulty is experienced in designing a circuit which accommodates both of the two different controls. Additionally, the controls are liable to be disturbed and/or caused to oscillate even by a small magnitude of external disturbance. The second expedient relying on ink having stable characteristics against temperature may minimize the deviation in deflection as long as the temperature variation remains small, but still permits a substantial deviation when the temperature varies to a large extent due to a substantial change in the viscosity of the ink.

Figure 2A:
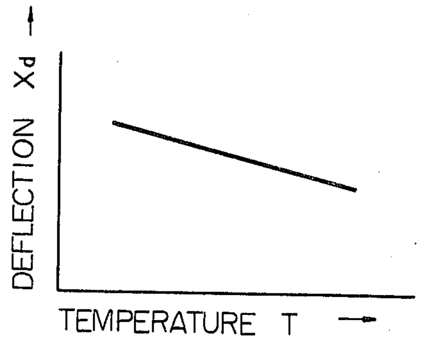
Figure 2B:
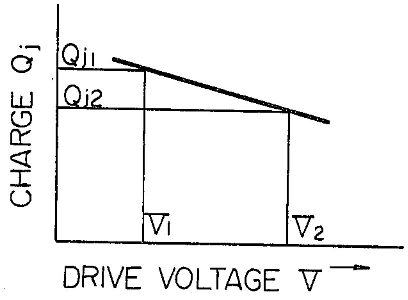
Figure 3A:
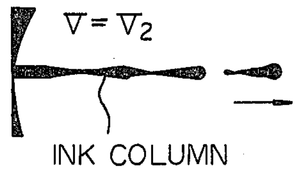

The amount of charge on an ink droplet is determined by a potential difference between the charging electrode and ink, which develops when the ink droplet is separated from an ink jet or column. An electric field resulting from a voltage applied to the charging electrode acts on that part of an ink column which is at the tip and about to form a droplet, so that a charge opposite in polarity to that of the charging electrode is induced. The amount of this charge on the ink depends on the voltage applied to the charging electrode. In this situation, the part of the ink at the tip or head of the column is separated from the column to constitute a charged ink droplet. The amount of charge induced at the head of the ink column depends not only on the discussed voltage level at the charging electrode but on the shape of the ink at the head of the column. Particularly, the larger the spherical shape at the head, the more electric force lines from the charging electrode concentrate, the more the electric field concentrates, and the larger the amount of induced charge. Where the amplitude of the drive voltage for the electrostrictive vibrator is relatively large, the ink column has a relatively small spherical shape at its head as shown in FIG. 3*a* which limits the amount of charge deposited thereon. As the amplitude of the drive voltage is reduced, the spherical head of the ink column grows bigger as viewed in FIG. 3*b* with the resultant increase in the amount of charge. As indicated in FIG. 2*b*, the amount of charge on an ink droplet is approximately inversely proportional to the drive voltage level V. Experiments have shown that a change of the drive voltage by 10 V causes the amount of charge to vary by about 5%.

The present invention contemplates to control the amount of deflection by utilizing such relation of the amount of charge to the amplitude of the drive voltage. In accordance with the present invention, the amplitude of the drive voltage will be reduced when the temperature is high in order to increase the amount of charge while, when the temperature is low, it will be increased to reduce the amount of charge, thereby maintaining the amount of deflection $x_d$ constant. This is a drive voltage control which is different from the charge voltage level control and, hence, these controls do not interfere with each other and can be set independently of each other.

Figure 3B:
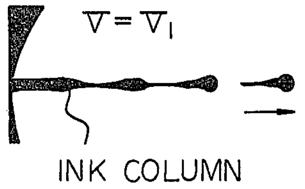

Referring to FIG. 1, there is shown an apparatus embodying the present invention. Ink is fed under pressure to a nozzle cylinder 1 of an ink ejection head and ejected from a nozzle 1*a*. A cylindrical electrostrictive vibrator 2 is bonded to the outer periphery of the nozzle cylinder 1. A drive voltage generation circuit 7 supplies the vibrator 2 with a drive voltage having a predetermined frequency whereby the vibrator 2 repeatedly contracts and expands to apply pressure oscillation at the frequency of the drive voltage to the ink in the nozzle cylinder 2. The vibration causes an ink column or jet extending from the nozzle 1*a* be ejected so that, at a location spaced from the nozzle 1*a* by a certain distance, a droplet separates from the ink column as shown in FIGS. 3*a* and 3*b* and then flies toward a gutter 6. At the instant of separation and when a certain level of voltage is applied to a charging electrode 3, the ink droplet is charged in accordance with the level of the voltage. This charged droplet advances along a path between deflecting electrodes $4_1$ and $4_2$ to be deflected by an electric field established between the two electrodes and by an amount proportional to the amount of charge. Then the thus charged and deflected ink droplet impinges on a recording or copy sheet 5. Non-charged droplets and droplets charged to the opposite polarity are captured by the gutter 6.

As shown in FIG. 1, the drive voltage generation circuit 7 comprises a resonance amplifier circuit consisting of a coupling capacitor $C_1$, resistors $R_1$–$R_3$, a transistor $Tr_1$, a coil L and a capacitor $C_2$ for resonance, an emitter-follower amplifier circuit consisting of a coupling capacitor $C_3$, resistors $R_4$–$R_6$ and a transistor $Tr_2$, a computing amplifier circuit made up of resistors $R_7$–$R_{10}$, an operational amplifier OPA and a negative characteristic thermistor $R_n$, and a power amplifier PAM.

The resonance amplifier circuit produces a sinusoidal wave in response to input clock pulses having a predetermined period. The emitter-follower amplifier amplifies the sinusoidal output of the resonance amplifier and couples it to the resistor $R_7$ of the computing amplifier. Assuming that the current amplification rate of the transistor $Tr_2$ is $h_{fe}2$, $[R_4 \cdot R_5/(R_4+R_5)]/h_{fe}2$ is predetermined to be smaller than $R_7$. In this instance, the gain or amplification factor G of the computing amplifier is $$G=(R_{10}+R_n)(R_7+R_8)/(R_7R_8) \quad \ldots \text{Eq. (2)}$$

Thus, the gain G of the computing amplifier increases when the resistance $R_n$ of the negative characteristic thermistor $R_n$ is large (when the temperature is low) and decreases when the resistance $R_n$ is small (when the temperature is high). Accordingly, the electrostrictive vibrator 2 is supplied with a high level voltage when the temperature is low and with a low level voltage when the temperature is high. The amount of deflection is in this way maintained constant although the ambient temperature may vary.

The negative characteristic thermistor $R_n$ may be connected in series with the resistor $R_8$ or it may replace the resistor $R_8$. Where use is made of a positive characteristic thermistor, it may be connected in series with the resistor $R_7$. With such connections both a negative characteristic thermistor and a positive characteristic thermistor may be installed. It is preferable to dispose the thermistor $R_n$ in an ink reservoir in order to sense the temperature of ink therein. However, since the temperature of ink is generally the same as the room temperature, positioning the thermistor in the ink is not always necessary.

While the drive voltage generator 7 shown in FIG. 1 has the thermistor $R_n$ connected with the computing amplifier circuit, a transistor or like element for gain control may be connected with the computing amplifier such that its impedance is controlled by a signal generated outside of the computing amplifier. With this arrangement, the amount of charge can be controlled not only in accordance with the temperature but by signals independent of the temperature such as for controlling the printing size.

In summary, it will be seen that the present invention overcomes the drawbacks of the prior art and provides an improved ink jet printing apparatus in which deflection of the ink jet is independent of temperature. Various modifications will become possible for those skilled in the art after receiving the teachings of the present disclosure without departing from the scope thereof.

What is claimed is:

1. An ink jet printing apparatus including an ink ejection head, vibrator means for applying pressure oscillation to the head thereby causing a jet of ink to be ejected from the head and separate into droplets, charging means for applying an electrostatic charge to the droplets and deflection means for deflecting the charged droplets, characterized by comprising:

ink temperature sensor means for sensing an ink temperature; and computing means for controlling an amplitude of pressure oscillation applied by the vibrator means to the head as a function of sensed ink temperature which is predetermined in such a manner that an amount of deflection of the charged droplets is the same at all ink temperatures;

the computing means being constructed to control the vibrator means in such a manner as to increase the amplitude of pressure oscillation as the ink temperature decreases and vice-versa;

the vibrator means comprising an electrostrictive vibrator fixed to the head, an A.C. signal generator for producing a constant A.C. signal, and an amplifier connected between the generator and the vibrator, the computing means controlling an amplification factor of the amplifier in accordance with an output of the sensor means.

* * * * *